FIG. 1.
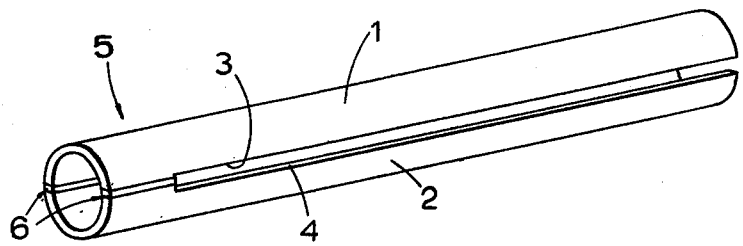
FIG. 2.
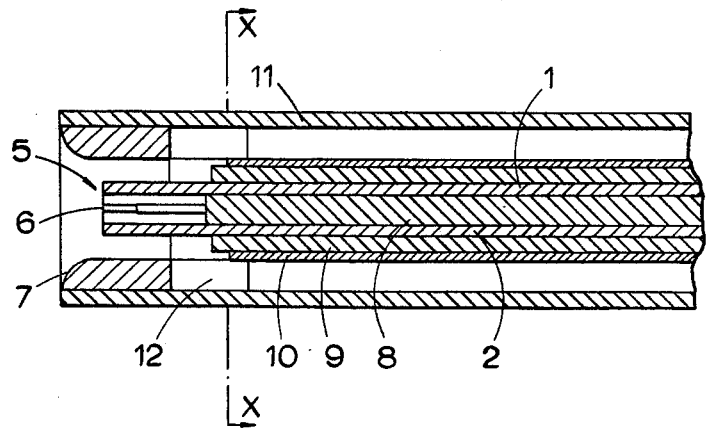
FIG. 3.
INVENTOR
Arthur Richard Brady
BY Kenyon, Palmer, Stewart & Estabrook
ATTORNEY

United States Patent Office 3,473,969
Patented Oct. 21, 1969

3,473,969
HOLLOW TUBE THERMOCOUPLE ELEMENTS FOR A SONIC PYROMETER
Arthur Richard Brady, Greenford, England, assignor to Ultra Electronics Limited, Acton, London, England
Filed Apr. 27, 1967, Ser. No. 634,380
Claims priority, application Great Britain, Apr. 27, 1966, 18,416/66
Int. Cl. H01v 1/32
U.S. Cl. 136—231                9 Claims

ABSTRACT OF THE DISCLOSURE

Thermocouple elements for sonic pyrometers consist of a hollow tube formed by dissimilar materials joined by way of thermocouple junctions which extend axially from the mouth of the tube. The thermo-electric potential generated across the junction is a measure of the temperature of the fluid drawn through the tube.

---

The invention relates to thermocouple elements and to the manufacture thereof. The thermocouple elements may be used for measuring the temperature of a flowing fluid, such as the exhaust gasses from an engine.

A thermocouple element as generally accepted consists in a junction between two dissimilar electrical conductors usually in wire or rod form, the junction being formed either by clamping the wires or rods in intimate contact, or by welding the wires to form an alloyed junction. When such a junction is subjected to a temperature change, there is generated at the junction an electromotive force, which can be used to provide an indication of the temperature of the fluid medium in which the thermocouple is immersed.

If it is required to measure the temperature of the exhaust gasses from a gas turbine engine the thermocouple element should be sufficiently robust to withstand vibration stresses set up when the turbine is running, and preferably the thermocouple element should have a fast response to temperature changes in the gas stream. It is known that a fast response to temperature changes can be achieved by reducing the mass of the thermocouple junction or by increasing the surface area exposed to the gas stream whilst retaining the same mass of junction material. However, both these proposals can weaken the structure.

It is an object of the present invention to provide a thermocouple element and a method of manufacturing it so that the thermocouple has a fast temperature response and is sufficiently robust to withstand vibration stresses to which it will be subjected in operation.

The thermocouple elements according to the invention are particularly suitable for use in suction or sonic pyrometers. A suction pyrometer or, as it is now more generally known, a sonic pyrometer comprises a convergent nossle through which fluid is drawn past a thermocouple junction. Hitherto the thermocouple junction has been formed between two electrical conductors of different materials in the form of rods or wires. With sonic pyrometers the fluid is made to flow through the nossle with a velocity at the thermocouple junction of Mach 1 or more. This improves the host transfer to the thermocouple and allows fluctuations in the velocity of the fluid to be compensated for easily in the circuit arrangement for measuring the E.M.F. generated by the thermocouple as an indication of the temperature of the junction. Hitherto, it has been found that if the diameter of the wire of the thermocouple is made small to provide a fast response to temperature changes, the junction will be completely eroded very quickly due to the abrasive action of the sonic gasses.

According to the invention there is provided a thermocouple element comprising two electrically dissimilar conductive members connected by way of two thermocouple junctions to form a section of hollow pipe.

The thermocouple junctions may be formed by welding the two conductive members together such as by electron beam welding. The thermocouple junctions lie along the length of the pipe section so that all of the pipe section has to be eroded before the element ceases to function. The length of the pipe section may be made sufficiently short to restrict the mass of the thermocouple junction and so obtain a fast temperature response. As the two thermocouple junctions are effectively in parallel in any measuring circuit arrangement the temperature response is faster than a single junction having a mass equal to the total mass of the two junctions and yet the E.M.F. power developed is substantially doubled. If necessary the hollow pipe section may include more than two thermocouple junctions.

The electrically dissimilar conductive members are preferably identical in shape and stamped out or formed from strip material. The combinaton of materials for the electrically dissimilar members may be selected from any pair of thermoelectric material. Preferably, when the element is used in a sonic pyrometer for measuring the temperature of the exhaust gasses from a turbine the two materials are alloys containing two or more of the elements platinum, palladium and gold in different proportions such as: First member, termed positive—consists of 55% palladium, 31% platinum, 14% gold. Second member, termed negative—consists of 65% gold, 35% palladium.

A specific embodiment of the invention will now be described by way of example with reference to the accompanying drawing in which:

FIGURE 1 is a perspective view showing diagramatically the construction of the thermocouple element;

FIGURE 2 is a longitudinal section through a suction pyrometer using a thermocouple element of the kind shown in FIGURE 1; and FIGURE 3 is a transverse section on the line x—x of FIGURE 2.

As shown in FIGURE 1 of the drawings, the thermocouple element consists of two half-tube section members 1 and 2 fitted together to form a tube. Each member is made of one of two dissimilar materials which together form the thermocouple. The pairs of edges 3 and 4 of the half-tubes 1 and 2 are machined back leaving a short section 5 of full 180° section at one end only. The half-tubes 1 and 2 are then brought together in the manner shown with the edges of the full 180° section 5 abutting. Thermocouple junction 6 are formed by scan or spot welding axially along the abutment seams between the half-tubes 1 and 2.

The cross sectional shape of the thermocouple halves need not be semicircular, they may be of rectangular channel section or other suitable form.

An alternative method of constructing the hollow section 5 of the pipe is to insert a flat parallel sided strip of material in a die and stamping the strip to a half-tube section with one end of the strip enlarged by exerting greater pressure over this section during the stamping operation.

A similarly formed strip of the dissimilar material is then aligned with the other formed strip and the enlarged end sections welded by electron beam welding to form the two alloyed thermocouple junctions. The pipe may be formed by any number of pair of thermocouple junctions formed between dissimilar electrically conductive members. Although it is convenient to make the members forming the pipe of similar shape the 180° section may consist of one of the selected thermocouple materials with a slot cut or otherwise formed therein, which slot is filled with the other selected thermocouple material to complete the 180° hollow section of pipe.

In a particular embodiment positive member, say the member 1, consisted of an alloy material sold by Engelhard Industries Limited under the trade name Platinel I or Platinel II. Platinel I consists of 83% palladium, 14% platinium and 3% gold. Platinel II consists of 55% palladium, 31% platinium and 14% gold. The negative member, say the member 2, consisted of an alloy of 65% gold and 35% palladium. The material for the pipe was 0.005 inch thick and was formed with a radius of 0.025 inch. The step in each half-tube section was 0.008 inch so as to provide a slot gap of 0.016 inch. The length of the thermocouple junction, i.e. the full 180° hollow section of pipe, was 0.0625 inch.

Referring now also to FIGURES 2 and 3 the thermocouple element as shown in FIGURE 1 is mounted in a sonic pyrometer so that the thermocouple junctions 6 are positioned in a convergent nozzle throat 7. A pressure difference is maintained across the convergent throat 7 so that the gas velocity in the nozzle and through the hollow section 5 at the location of the thermocouple junctions 6, is equal to or greater than the velocity of sound in the gas i.e. Mach 1. The thermocouple element is supported internally by a rod 8 of electrically insulating material. The members 1 and 2 extend from the section 5 to the measuring circuit arrangement (not shown). A tube 9 of electrically insulating material is fitted closely over the outside of the thermocouple element. A metal tube 10 is fitted over the outside of the tube 9 to provide a rigid support for the assembly. The convergent nozzle throat 7 is carried within an outer sheath 11 and fins 12 extending from the nozzle 7 support one end of the tube 10. The other end of the assembly in a manner which allows an exhaust passage for the gas passing through the nozzle throat 7.

The gas which passes through the hollow section 5 of the pipe escapes through the slots between the members 1 and 2 between the end of the rod 8 and the thermocouple junctions 6.

The tubular construction permits a robust cantilever beam assembly of greatly increased section modulus than that of a wire thermocouple and, due to the small junction mass and large exposed surface area, a fast temperature response.

What I claim is:
1. A thermocouple element for a sonic pyrometer comprising two electrically dissimilar conductive members connected by way of two thermocouple junctions to form a continuous section of hollow pipe with the two junctions being electrically in parallel between said two members.
2. A thermocouple element as claimed in claim 1 in which the pipe is of substantially circular cross section.
3. A thermocouple element as claimed in claim 2 in which the conductive members are shaped substantially identically.
4. A thermocouple element as claimed in claim 1 in which the conductive members are shaped substantially identically.
5. A thermocouple element as claimed in claim 1 in which the dissimilar conductive members consist of alloys formed from the elements palladium, platinum and gold.
6. A thermocouple element for a sonic pyrometer comprising a split hollow tube of two dissimilar conductive members supported on an electrically insulating rod and having a section cantilever supported by said rod, said conductive members being connected together by parallel thermocouple junctions in said cantilevered section of said tube.
7. A thermocouple element assembly as claimed in claim 6 in which the split tube is contained within a closely fitting electrically insulating pipe.
8. A thermocouple element assembly as claimed in claim 7 in which the electrically insulating rod is supported by a metal sheath.
9. A thermocouple element as claimed in claim 6 in which the dissimilar conductive members consist of alloys formed from the elements palladium, platinum and gold.

References Cited
UNITED STATES PATENTS

| 2,378,804 | 6/1945 | Sparrow et al. | 136—225 |
| 2,672,492 | 3/1954 | Sukacev | 136—225 |
| 3,283,580 | 11/1966 | Nanigian et al. | 136—230 X |
| 3,329,533 | 7/1967 | Zysk | 136—236 |

FOREIGN PATENTS

| 34,505 | 2/1929 | France. |

WINSTON A. DOUGLAS, Primary Examiner
M. J. ANDREWS, Assistant Examiner